United States Patent
Wacker

(10) Patent No.: US 7,826,929 B2
(45) Date of Patent: Nov. 2, 2010

(54) LOW COST PROGRAMMABLE HVAC CONTROLLER HAVING LIMITED MEMORY RESOURCES

(75) Inventor: Paul C. Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 835 days.

(21) Appl. No.: 11/427,750

(22) Filed: Jun. 29, 2006

(65) Prior Publication Data
US 2008/0015739 A1 Jan. 17, 2008

(51) Int. Cl.
G06F 19/00 (2006.01)

(52) U.S. Cl. ........................ 700/276; 717/109

(58) Field of Classification Search ............... 700/276, 700/83, 160, 11, 1; 454/256; 236/1, 49.3; 717/109
See application file for complete search history.

(56) References Cited

U.S. PATENT DOCUMENTS

| | | | |
|---|---|---|---|
| 5,363,904 A * | 11/1994 | Pierret et al. ............... 165/238 |
| 5,394,327 A * | 2/1995 | Simon et al. .................. 701/1 |
| 5,449,319 A | 9/1995 | Dushane et al. | |
| 6,330,806 B1 | 12/2001 | Beaverson et al. | |
| 6,453,687 B2 | 9/2002 | Sharood et al. | |
| 6,783,079 B2 * | 8/2004 | Carey et al. ............... 236/46 R |
| 6,934,762 B1 * | 8/2005 | Lange et al. ................. 709/239 |
| 6,934,862 B2 | 8/2005 | Sharood et al. | |
| 7,083,109 B2 * | 8/2006 | Pouchak ..................... 236/1 E |
| 7,222,800 B2 * | 5/2007 | Wruck ........................ 236/51 |
| 2004/0144849 A1 | 7/2004 | Ahmed | |
| 2004/0238653 A1 | 12/2004 | Alles | |
| 2004/0267515 A1 * | 12/2004 | McDaniel et al. ............ 703/22 |

FOREIGN PATENT DOCUMENTS

| | | |
|---|---|---|
| EP | 1008817 | 6/2000 |
| EP | 1380909 | 1/2004 |
| GB | 2257538 | 1/1993 |
| GB | 2262625 | 6/1993 |
| WO | 03067457 | 8/2003 |

* cited by examiner

Primary Examiner—Kidest Bahta
(74) Attorney, Agent, or Firm—Crompton Seager & Tufte LLC

(57) ABSTRACT

A programmable controller and method of operating a programmable controller are provided. In one illustrative embodiment, the programmable controller may have non-volatile memory and random-access memory (RAM), which, in some cases, may be implemented in a single microcontroller. The illustrative programmable controller may include a function block engine resident in the non-volatile memory, a block execution list being resident in the non-volatile memory, and a parameter and/or variable storage space being resident in RAM. The function block engine may execute a program according to a list of function blocks identified in the block execution list. In some cases, the program can be executed from the non-volatile memory, which in some cases may be FLASH memory. Additionally, in some cases, the non-volatile memory may include a firmware portion and a user programmable portion. The block execution list may be stored in the user programmable portion, allowing field programmability and configuration of the function blocks.

32 Claims, 5 Drawing Sheets

LOW COST PROGRAMMABLE HVAC CONTROLLER HAVING LIMITED MEMORY RESOURCES

FIELD

The present invention relates generally to programmable controllers, and more particularly, to low cost programmable controllers that require limited random access memory resources.

BACKGROUND

Many programmable controllers, including many HVAC controllers, have a microcontroller or microprocessor that executes a software program stored in memory. In many cases, the software program is executed using an interpreter engine. An interpreter engine typically takes a program stored in a meta-language or the like, compiles and interprets the program, and then execute the interpreted instructions. In many cases, the interpreter engine executed the software program either wholly or partially from random-access memory (RAM).

One common problem with many programmable controllers is that they can require a substantial amount of RAM memory in order to execute even relatively simple software programs. This can be especially true when the programmable controller uses an interpreter engine to execute the program code. RAM, being a relatively expensive form of memory, can greatly increase the cost of manufacturing and producing a programmable controller. The least expensive form of a processor is often a microcontroller, which typically only has a limited amount of on-board RAM. What would be desirable, therefore, is a low cost programmable controller that can execute relatively complex software programs using only a minimal amount of RAM resources.

SUMMARY

The following summary of the invention is provided to facilitate an understanding of some of the innovative features unique to the present invention and is not intended to be a full description. A full appreciation of the invention can be gained by taking the entire specification, claims, drawings, and abstract as a whole.

The present invention relates generally to programmable controllers, and more particularly to low cost programmable controllers such as HVAC controllers that can execute relatively complex software programs using only a minimal amount of RAM resources. In one illustrative embodiment, the programmable HVAC controller includes a function block engine for executing at least one program. The function block engine may be resident in non-volatile memory of the controller, and may reference a block execution list. The block execution list may also be resident in non-volatile memory, and may identify a sequential listing of function blocks that, when executed, perform a desired controller function.

In some cases, the block execution list may be field programmable, allowing the programmable controller to be programmed or reprogrammed in the field. The controller may include a parameter and/or variable storage space resident in RAM memory, which may be accessed by the function blocks. In some cases, parameters and/or variables may be passed between function blocks though the parameter and/or variable storage space.

BRIEF DESCRIPTION

The invention may be more completely understood in consideration of the following detailed description of various illustrative embodiments of the invention in connection with the accompanying drawings, in which.

DETAILED DESCRIPTION

Figure 1:
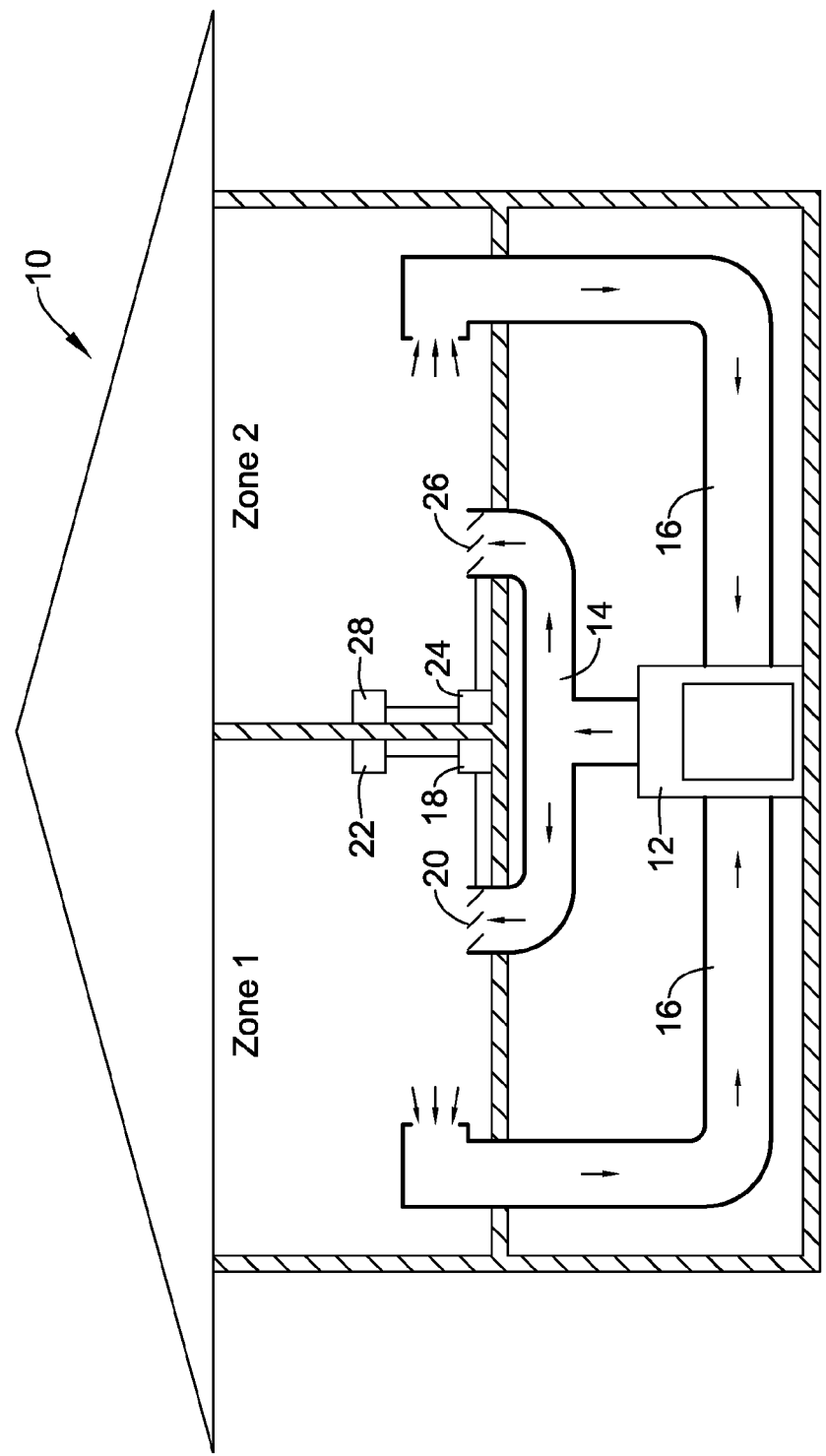
FIG. 1 is a perspective view of a building or structure having an illustrative zoned HVAC system.

The following description should be read with reference to the drawings wherein like reference numerals indicate like elements throughout the several views. The detailed description and drawings show several embodiments which are meant to be illustrative of the claimed invention.

The present invention relates generally to programmable controllers, and more particularly to low cost programmable controllers that can execute relatively complex software programs using only a minimal amount of RAM resources. While not so limited, an HVAC controller is presented below as an example to help the reader gain a clear understanding of various aspects of the present invention. However, it should be recognized that the present invention can be applied to any type of controller, depending on the application at hand.

FIG. 1 is a perspective view of a building or structure 10 having an illustrative HVAC system, and in this particular example, a zoned HVAC system. Zoned HVAC systems can provide more flexibility and comfort within a building or structure 10 by allow heating and cooling of individual zones based on heating or cooling demands of the individual zones. In some cases, this can help to increase the efficiency of the HVAC system by allowing heating or cooling of one zone instead of the entire building or structure 10. Additionally, the individual heating or cooling of zones may help increase the speed of heating or cooling each zone by focusing more of the heated or cooled air to that zone.

The illustrative zoned HVAC system includes a forced air HVAC appliance, such as, for example a forced warm air furnace 12, a system of vents or ductwork 14 and 16, one or more controllers 18 and 24, a plurality of thermostats 22 and 28, and a plurality of dampers 20 and 26. Each zone in the building 10 may include at least one thermostat 22 and 28 and at least one damper 20 and 26. A zone in a HVAC system can include a single room in the building or structure 10, multiple rooms in the building or structure 10, or any area in the building or structure 10, as desired. Furthermore, zones can be arranged throughout the building or structure 10 in any arrangement, as desired. Merely for illustrative purposes, the illustrated building 10 has two zones, zone 1 and zone 2. However, it should be understood that the present invention may be incorporated into any number of zones in a building or structure 10, including a single zone.

The forced warm air furnace 12 can provide heated air via the ductwork throughout the building 10 or structure. It is contemplated that the HVAC system could include any furnace 12 or boiler, or any other appliance that could provide heating (or cooling) to the building or structure 10, as desired. The forced warm air furnace 12 may be in fluid communication with every zone in the building 10 or structure (e.g. both zone 1 and zone 2) via the ductwork. When a heat demand signal is received by a HVAC controller (not shown), the forced warm air furnace 12 may be activated to supply heated air to one or more zones within the building 10 or structure via supply air ducts 14. In this example, the cooler air from each zone may returned to the forced warm air furnace 12 for heating via return air ducts 16.

The HVAC controller can control the operation of the forced warm air furnace 12, such as controlling the blower/fan and/or the combustion of the forced warm air furnace 12. The HVAC controller can be coupled to the thermostats 22 and 28 in each zone, and when the thermostats 22 and 28 sends a demand signal for heat, the HVAC controller can activate the forced warm air furnace 12 to provide heating.

In zone 1, a controller 18 may be coupled to damper 20 and a thermostat 22. Likewise, in zone 2, a controller 24 may be coupled to damper 26 and a thermostat 28. The controllers 18 and 24 may be separate controllers, or may be part of a unified controller, such as a unified HVAC controller. The controllers 18 and 24 can coordinate the dampers 20 and 26 with the forced warm air furnace 12 based on input from thermostats 22 and 28 to provide heating to appropriate zones when heating is demanded. For instance, if zone 1 desires heating and zone 2 does not desire heating, controller 18 in zone 1 can actuate damper 20 to an open position while controller 24 in zone 2 can actuate damper 26 to a closed position. Thus, the heated air provided by the forced warm air furnace may be provided to zone 1 and not zone 2. Similarly, if zone 2 desires heating and zone 1 does not desire heating, controller 18 can actuate damper 20 to a closed position and controller 24 can actuate damper 26 to an open position. Then, the heated air provided by the forced warm air furnace 12 can be provided to zone 2 and not zone 1. Additionally, if heating is desired in both zone 1 and zone 2, both controllers 18 and 24 can actuate dampers 20 and 26 to open positions so that both zones may be provided the desired heated air from the forced warm air furnace 12. This is just one example of a typical HVAC system.

Figure 2:
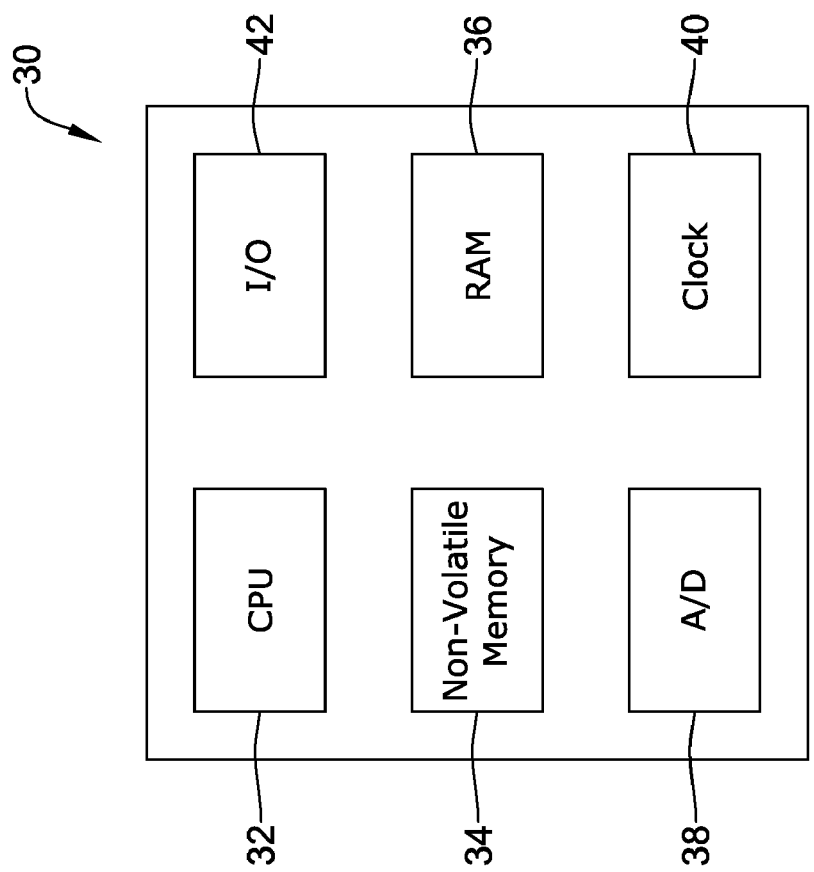
FIG. 2 is a block diagram of an illustrative programmable HVAC controller.

FIG. 2 is a block diagram of an illustrative programmable HVAC controller according to one illustrative embodiment of the present invention. The illustrative HVAC controller may be a programmable thermostat, or may be separate from the thermostat. In either case, the HVAC controller may provide one or more control signals that effect the operation of the HVAC system.

The illustrative HVAC controller includes a microcontroller 30 having non-volatile memory 34 and random-access memory (RAM) 36. Additionally, the illustrative microcontroller 30 includes a central-processing unit (CPU) 32, analog-to-digital converters (A/D) 38, input/outputs (I/O) 42, and a clock 40 or timer. The illustrative microcontroller 30 may include more or less than these illustrative components, depending on the circumstances. As illustrated, the aforementioned components may be provided internal to the microcontroller 30 without the need for any external components, but this is not required.

In some cases, the least expensive form of processor is a microcontroller. Microcontrollers typically contain all the memory 34 and 36 and I/O 42 interfaces, integrated on a single chip or device without the need for external components. As noted above, one advantage of using a microcontroller 30 is the low cost when compared to the cost of a typical microprocessor. Additionally, microcontrollers 30 may be designed for specific tasks, such as HVAC tasks, which can help simplify the controller and reduce the number of parts needed, thereby further reducing the cost. While the use of a microcontroller may have some benefits, it is contemplated that the present invention may be used in conjunction with a microprocessor or any other suitable controller, as desired.

In the illustrative microcontroller 30, the non-volatile memory 34 may be FLASH memory. However, it is contemplated that the non-volatile memory 34 may be Read Only Memory (ROM), programmable Read Only Memory (PROM), Electrically Erasable Programmable Read Only Memory (EEPROM), Random Access Memory (RAM) with a battery back-up, or any other suitable non-volatile memory 34, as desired. In the illustrative embodiment, the amount of FLASH memory may be less than 100 Kb. In one case, the amount of FLASH memory may be about 60 Kb, however it is contemplated that any amount of FLASH may be used depending on the requirements per application.

In some illustrative embodiments, the non-volatile memory 34 may be configured to have at least two portions including a first portion that is the equivalent of ROM and a second portion that is the equivalent of EEPROM. The first portion of non-volatile memory 34, often called the firmware portion, may be used to store at least in part one or more execution modules, such as, for example, a function block engine. In some cases, this portion of the non-volatile memory 34 may be programmed at the factory, and not subsequently changed. Additionally, the one or more execution modules (e.g. function block engine) stored in the firmware portion may execute, in some cases, one or more function blocks also stored in the non-volatile memory 34.

The second portion of the non-volatile memory 34 may include application configuration modules or data, including for example, a block execution list. In some cases, the non-volatile memory 34 in this second portion may be divided further to contain segments of data. This portion of the non-volatile memory 34 may be capable of being reconfigured post factory, such as during installation of the controller into an HVAC system in a building or structure. In other words, in some illustrative embodiments, the second portion of the non-volatile memory may be field programmable. In some cases, the amount of non-volatile memory 34 allotted for the second portion may be about 5 Kb. However, it is contemplated that any amount of field programmable memory may be provided, as desired.

It is further contemplated that the non-volatile memory 34 may also have a portion dedicated for the storage of constant values. This portion of memory may be provided in, for example, the firmware portion and/or the field programmable portion, as desired.

In the illustrative microcontroller 30, the RAM 36 may be used for variable storage. In some cases, the RAM 36 may be a relatively small repository for exchanging information during execution of the one or more programs or subroutines stored in the non-volatile memory 34. The RAM 36 may also be used for hosting the operating system of the microcontroller 30 and/or the communication capabilities, such as external interfaces. In the illustrative microcontroller 30, the amount of RAM 36 included may be about 5 Kb or less, 2 Kb or less, or any other suitable amount of RAM. In some cases, the operating system and communication capabilities may consume about 1 Kb of RAM 36, leaving about 1 Kb for other functions, such as storing variables and/or other data for the one or more programs.

The CPU 32 for the illustrative microcontroller 30 may interpret and execute instructions, and may control other parts of the microcontroller 30 as desired. In some cases, the CPU 32 may include a control unit and an arithmetic-logic unit contained on a chip. The clock 40 can provide a steady stream of timed pulses for the microcontroller 30, which may be used, for example, as the internal timing device of the microcontroller 30 upon which operations may depend. The I/Os 42 can transfer data to and from the microcontroller 30 and an external component. In some cases, for each input, there may be a corresponding output process and vice versa. The A/D 38 converter can provide transformations of an analog input into a digital input format helping to enable the microprocessor to be able to read and interpret analog input signals. In some cases, a D/A converter may also be provided to allow digital signals to be provided as analog outputs, if desired.

Figure 3:
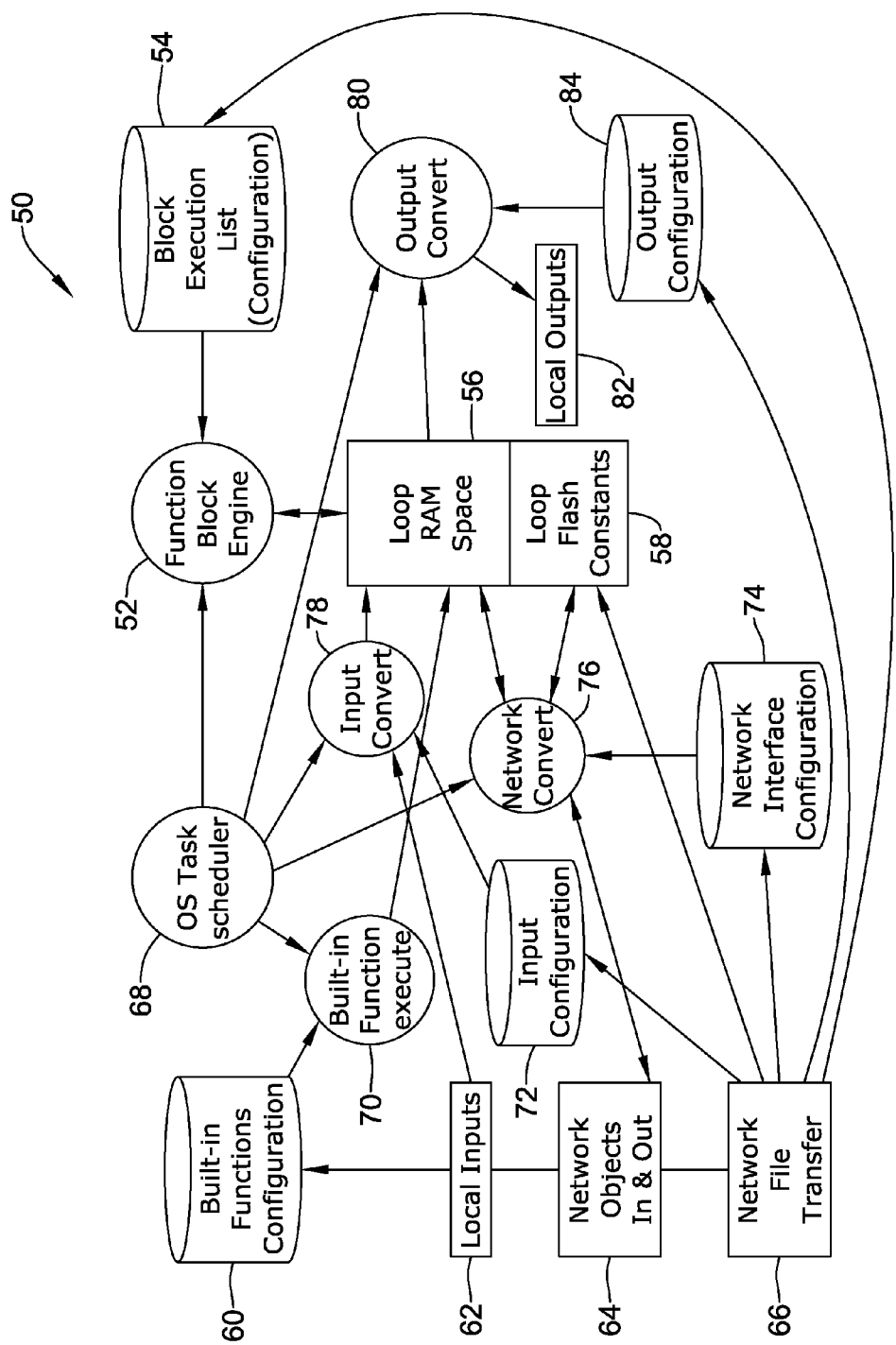
FIG. 3 is a schematic diagram of an illustrative application framework of a programmable controller according to an illustrative embodiment of the present invention.

FIG. 3 is a schematic diagram of an illustrative application framework of a programmable controller 50 according to one illustrative embodiment of the present invention. The illustrative controller 50 includes one or more execution modules, one or more application configuration modules, and a parameter and variable storage space. The execution modules, as illustrated by the circles in FIG. 3, can include a function block engine 52, a built-in function execute module 70, an input convert module 78, a network convert module 76, and an output convert module 80. The application configuration modules, as illustrated by the cylinders, can include a block execution list 54, a built-in functions configuration 60, an input configuration 72, a network interface configuration 74, and an output configuration 84. The parameter and variable storage space can include a loop RAM space 56 and a loop flash constant space 58. Additionally, the illustrative controller 50 may include one or more external interfaces for communication capabilities, including a local input 62, a network file transfer 66, a network object in and out 64, and a local output 82. In some cases, the controller 50 may also include an operating system (OS) task scheduler 68.

The one or more execution modules can be resident in the non-volatile memory of the microcontroller 50, such as in FLASH memory. More specifically, in some cases, the one or more execution modules may be resident in the ROM equivalent or firmware portion of the non-volatile memory. At least one of the execution modules may include one or more programs, some of the one or more programs relating to the operation of the HVAC system. The one or more programs may include a set of sub-routines that the one or more execution modules can sequentially execute. The one or more execution modules may execute the one or more programs from the non-volatile memory.

The one or more application configuration modules can also be resident in the non-volatile memory, such as the FLASH memory, of the microcontroller 50. More specifically, the one or more application configuration modules can be resident in the EEPROM equivalent or the field programmable portion of the non-volatile memory. These modules can be pre-configured for standard HVAC applications or can be configured for custom HVAC applications, as desired. Additionally, the one or more application configuration modules can be field programmable. For example, in some cases, the one or more application configuration modules may be programmed and configured either during or after the installation of the controller into a HVAC system.

In some cases, the one or more application configuration modules can include a block execution list 54. The configuration of the block execution list 54 can direct the execution of the one or more execution modules (e.g. function blocks). In some cases, this configuration can be determined by the user or the installer. In some cases, a programming tool may be used that allows the installer to select the appropriate function blocks to create a custom block execution list 54, along with the appropriate configurations, to perform specific HVAC applications. This may help the one or more application configuration modules to be configured on a job-by-job basis, which in turn, can direct the execution of the execution modules on a job-by-job basis. In some cases, the one or more application configuration modules can include parameters or references that point to a location in memory for data, such as to the parameter and variable storage space.

The parameter and variable storage space may be provided in the controller 50 for the one or more execution modules and/or one or more application configuration modules to reference data or values to and from storage space. In the illustrative embodiment, the variable parameter storage space, or loop RAM space 56, may be resident in RAM. This storage space can be used for the temporary storage of variables or parameters, such as function block outputs and/or temporary values from inputs, either local inputs or network inputs, of the controller 50.

Also, in the illustrative embodiment, the constant parameter storage space, or loop flash constants 58, may be a storage space for storing constant values determined by the programmer or user. This storage space may be resident in non-volatile memory, such as the FLASH memory. Certain set points and operational parameters may be designated as constant parameter values selected by the application designer, installer, or user, and may be stored in the loop flash constants 58 storage space, if desired.

The HVAC controller 50 may also include external interfaces, such as local inputs 62 and local outputs 82. The local inputs 62 may be stored according to the input configuration 72 module executed by the input convert module 78. These modules may direct to storage the input value so that it can be used by other execution modules, such as the function block engine 52. The local outputs 82 may be configured according to the output configuration 84 as executed by the output convert module 80. This may output the value or data to an external HVAC component, such as a damper, thermostat, HVAC controller, or any other HVAC component as desired.

The OS task scheduler 68 may determine the operation and execution of the execution modules within the HVAC controller 50. For example, the execution modules may be executed in the following order: discrete inputs; including input convert 78 and network convert 76; built-in function execution 60; function block execution 52; physical output processing 80; and finally network output processing 76. However, it is contemplated that any suitable order may be used as desired.

Figure 4:
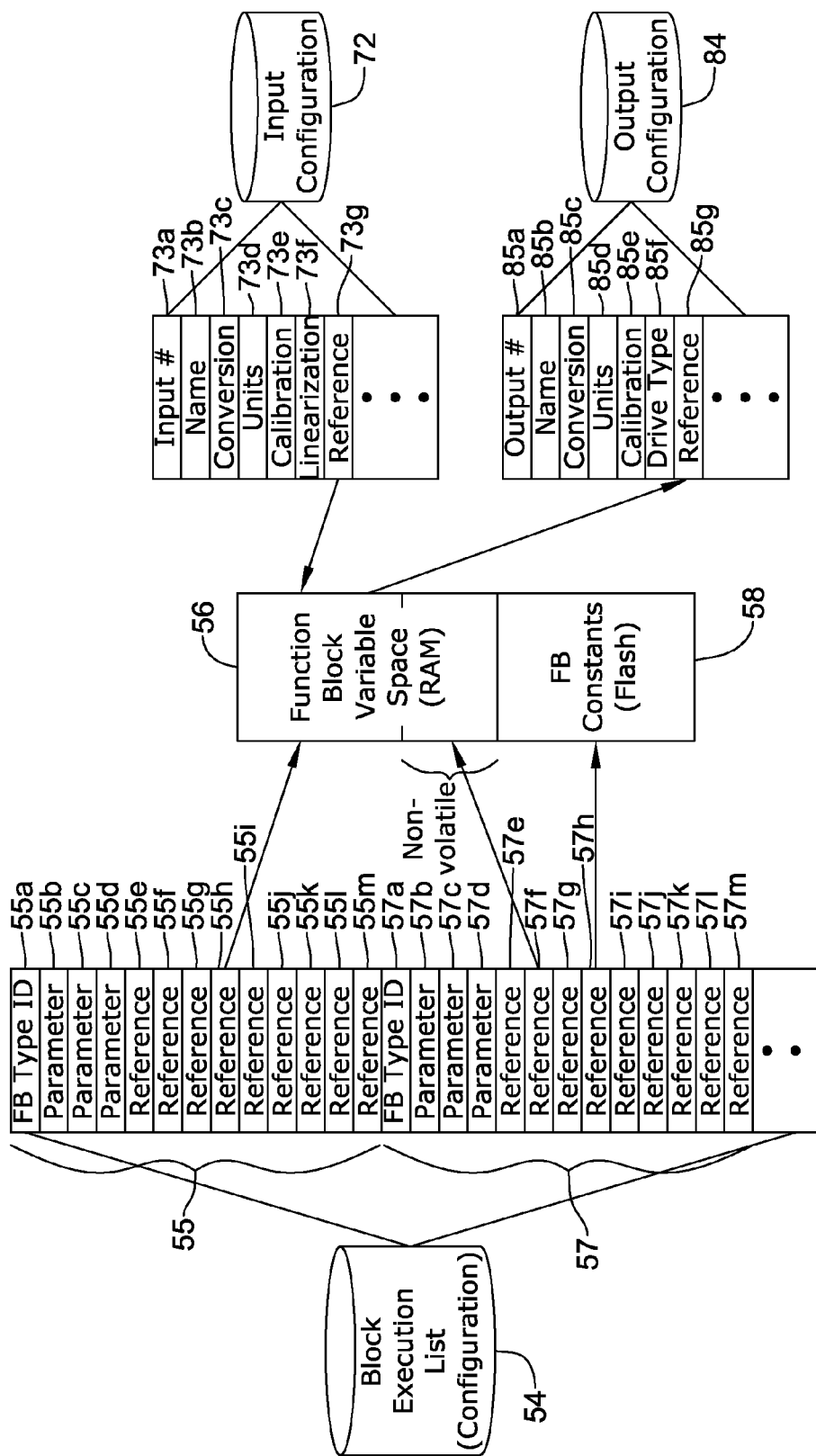
FIG. 4 is a schematic diagram of some of the illustrative application configuration modules of FIG. 3, including the illustrative block execution list.

FIG. 4 is a schematic diagram of some illustrative application configuration modules of FIG. 3, including an illustrative block execution list 54. As indicated above, the block execution list 54 may be resident in non-volatile memory, such as FLASH memory, and more specifically the field programmable portion of the FLASH memory, if desired. The illustrative block execution list 54 includes a listing of one or more function blocks 55 and 57, and is used to direct which function blocks and the order of execution of the function blocks, executed by the function block engine 52 according to its configuration.

The block execution list 54 may be programmed at the factory or by the user or the installer, to configure the order and type of function blocks 55 and 57 that are to be executed for the particular application. In some cases, the user or installer can have a programming tool that allows the user or installer to select the appropriate function blocks 55 and 57 and configuration to perform the desired tasks for the particular application. Thus, in some embodiments, the block execution list 54 configuration may be provided on a job-by-job basis for the controller. In some cases, this can allow the block execution list 54 to be programmed and configured in the field and changed depending on the desired application and function of the controller.

In the illustrative embodiment, the Function blocks 55 and 57 are modules that perform a specific task by reading inputs, operating on them, and outputting one or more values. The function block 55 and 57 can be defined according to the block execution list 54, which can be programmed by the factory, user, installer, or application designer. In the illustrative embodiment, function blocks 55 and 57 may be classified into 6 categories: analog function blocks, logic function blocks, math function blocks, control function blocks, zone control function blocks, and data function blocks. Some illustrative function blocks are shown in Appendix A.

As can be seen in Appendix A, the function blocks 55 and 57 may perform higher level functions, such as higher level functions for HVAC operations. Additionally, the controller may include some more generic function blocks for performing some basic applications, but, in many cases, these may be combined with other function blocks to perform higher level HVAC application.

Referring back to FIG. 4, function blocks 55 and 57 may include a number of function calls or pointers to particular locations in memory. In the illustrative embodiment, each function block 55 and 57 may include a function block type 55a and 57a, and a number of parameter or references 55b-m and 57b-m. The references and parameter 55b-m and 57b-m may point to variables or constants that are stored in the parameter and variable storage space, such as in either the function block variable space 56 or the function block constant space 58. Additionally, in some cases, the reference and parameters 55b-m and 57b-m may relate to other function block outputs, inputs (either local or network), or pointers to any other data, as desired.

In one illustrative embodiment, each function block may be about 22 bytes long. Each function block may include the function block type 55a and 57a, which can be one byte. Each function block can also include nine references or variables 55e-m and 57e-m, each reference or variable being allocated 2 byte WORD increments, totaling 18 bytes. Also, each function block 55 and 57 may include three parameter or configurations 55b-d and 57b-d, each being one byte, totaling 3 bytes. However, these sizes are merely for illustrative purposes and it is not meant to be limiting in any way.

It is contemplated that any size function blocks 55 and 57 may be used, and/or any number or size of function block types 55a and 57a, references or variables 55e-m and 57e-m, and parameters or configurations 55b-d and 57b-d. Furthermore, it is contemplated that the order may be the function block type 55a and 57a, then one parameter 55b and 57b, then the nine references 55e-m and 57e-m, and then the two remaining parameters 55c-d and 57c-d. More generally, it is contemplated that the function blocks 55 and 57 may be configured in any order and have any number of references and parameters, as desired.

The function block type 55a and 57a can be used to specify what function the function block 55 and 57 performs. Examples of functions that function block types 55a and 57a can perform include, but are not limited to, one or more of: determining a minimum; determining a maximum; determining an average; performing a compare function; performing an analog latch function; performing a priority select function; performing a hysteretic relay function; performing a switch function; performing a select function; performing an AND/NAND function; performing an OR/NOR function; performing an exclusive OR/NOR function; performing a one shot function; performing an add function; performing a subtract function; performing a multiply function; performing a divide function; performing a square root function; performing an exponential function; performing a digital filter function; performing an enthalpy calculation function; performing a ratio function; performing a limit function; performing a reset function; performing a flow velocity calculation function; performing a proportional integral derivative (PID) function; performing a adaptive integral action (AIA) function; performing a stager/thermostat cycler function; performing a stage driver function; performing a stage driver add function; performing a rate limit function; performing a variable air volume (VAV) damper flow control function; performing an occupancy arbitrator function; performing a general set point calculator function; performing a temperature set point calculator function; performing a set temperature mode function; performing a schedule override function; performing a run time accumulate function; performing a counter function; and performing an alarm function. Some of these functions are further described in Appendix A. More generally, any suitable function may be performed by function block types 55a and 57a, as desired.

Function block references 55e-m and 57e-m may be pointers to variables that can specify inputs, outputs and/or other data that is used by the function block 55 and 57. These variables may include data inputs that are used by the function block 55 and 57 during execution. In the illustrative embodiment, there may be a number of variable type references that may each have a unique mapping to a memory class. In the illustrative embodiment shown in FIG. 4, there are nine different types of variables: input, parameter, input/parameter, parameter/input, output floating point number, nonvolatile output floating point number, output digital, static floating point number, and static digital. The input variables may include an input reference for the function block 55 and 57 stored in, for example, RAM memory. The parameter variable may be a value for the function block 55 and 57 to use, which in some cases, can be stored in either RAM or FLASH memory. The input/parameter variable can be a reference to either an input or a parameter, with the default being an input and may, in some cases, be stored in either FLASH or RAM memory. The parameter/input variable can be either a parameter or an input with the default being a parameter, and in some cases, can be stored in FLASH memory. The output floating point number variable may be an output of the function block 55 and 57, which can be called up as an input to another function blocks that is later executed. In some cases, the output floating point number variables may be stored in volatile RAM memory. The nonvolatile output floating point number variable may be an output of the function block 55 and 57, which can be called up as an input to another function block. In some cases, nonvolatile output floating point number variables may be stored in non-volatile RAM memory so that it retains its value on a power outage. The output digital variable may be an output of the function block 55 and 57 that can be called up as an input to another function block. In some cases, the output digital variables may be stored in RAM memory. The static floating point number variable may allow a function block 55 and 57 to use floats as static RAM variables. The static digital variable may allows a function block 55 and 57 to use digitals as static RAM variables. Additionally, there may be unused references, indicating that these references/variables are unused. More generally, it is contemplated that there may be any number of variable type references, as desired.

The output of function blocks 55 and 57 can be stored, in some cases, in the RAM for later use by the function block engine. As indicated above, and in some cases, the outputs of a function block 55 and 57 can be used as an input reference to another function block 55 and 57. Additionally, in some cases, outputs can be referenced to the input of the same function block 55 and 57, when appropriate. However, if an input is referenced to its output, there may be a delay before receiving the output signal at the input of the function block (e.g. by one cycle or iteration) due to the sequential execution of the function blocks in one illustrative embodiment. In some cases, it may take about one second for the execution of the function blocks 55 and 57, but this is not required.

The parameters 55b-d and 57b-d may include design time configuration information needed by the function block 55 and 57 to execute. For example, the parameters 55b-d and 57b-d may instruct a corresponding function block 55 and 57 on how to initialize itself. In the illustrative embodiment, each function block 55 and 57 may have three parameters 55b-d and 57b-d, each including one byte of configuration information, for this purpose. However, it is contemplated that any suitable number of parameters of any suitable size may be used, as desired. In some cases, the parameter information may be entered by the application designer, the installer in the field, or the user, as desired. The parameters 55b-d and 57b-d may be configured to apply to just one specific function block type, one specific function block instance, or multiple function blocks, depending on the application. In some cases, the parameters 55b-d and 57b-d may be stored in the function block constants storage space 58, but this is not required.

The function block variable space 56 and the function block constant space 58 may be provided in the controller. For example, the function block variable space 56, which may change, may be resident in RAM memory of the controller. In some cases, the RAM may have a portion that is volatile and a portion that is non-volatile. In the volatile RAM, upon a power disruption, the data will be lost or reset, whereas in the non-volatile RAM, upon a power disruption, the data will be retained. Thus, data that is desirable to maintain upon a power disruption may be stored in the non-volatile RAM, while other data can be stored in the volatile RAM.

The function block constant space 58 may be a constant value storage space for data, such as parameters, as determined by the application designer, installer or user. The constant value storage space may be resident in non-volatile memory, such as FLASH memory. This may include certain set points and operational parameters that are designated as constant parameter values selected by the application designer at design time, by the installer, or the user. In order to change a constant parameter, and in some cases, a new function block configuration may have to be downloaded to the controller. Additionally, in some cases, a function block description, which may be available to the user, programmer, and/or installer, can provide details as to which parameters are variable and which are fixed. Providing the function block constant space 58 may help improve the efficiency of the controller by maintaining parameters and/or variables that may be used by the function blocks 55 and 57.

External interfaces, such as the network input/output and local input/output may also use the function block 55 and 57 variable space to map data in and out of the controller. To input data into the controller, an input configuration 72 may be provided to properly configure the input so that the function blocks identified in the block execution list 54 may properly reference the data. In some cases, the input configuration 72 may include an input number 73a, name 73b, conversion 73c, units 73d, calibration 73e, linearization 73f, and references 73g. The input reference may map the input to the function block variable space 56 resident in the RAM memory. An output configuration 84 may also be provided to configure outputs that may be mapped out of the controller. The output configuration 84 may include an output number 85a, name 85b, conversion 85c, units 85d, calibration 85e, drive type 85f, and references 85g. The output reference may map data from the function block variable space 56 resident in the RAM.

Figure 5:
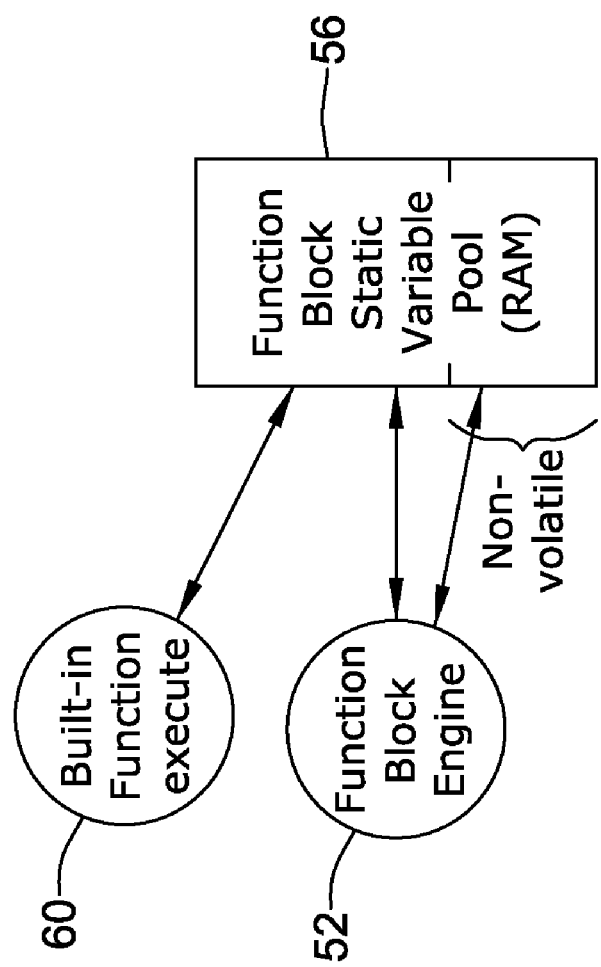
FIG. 5 is a schematic diagram of the illustrative one or more execution modules of FIG. 3 including the function block engine.

FIG. 5 is a schematic diagram of the illustrative one or more execution modules of FIG. 3 including the function block engine 52. As discussed previously, the function block engine 52 may be resident in the non-volatile memory of the microcontroller, more specifically, in the firmware portion of the non-volatile memory. The function block engine 52 can include one or more programs, such as one or more HVAC application programs. The functional block engine 52 may be a set of sub-routines that can sequentially execute function blocks identified by the block execution list. In some circumstances, the function block engine 52 may execute the function blocks every second in the order provided by the block execution list.

During execution, the function block engine 52 may follow the block execution list of function blocks. This may include reading variables and/or parameters stored in the function block variable pool 56 and/or the loop flash constants 58, as directed by the function blocks and/or block execution list. The function block engine 52 may execute the function blocks from the non-volatile memory, such as FLASH memory, using the data read from the parameters and/or variables. In some cases, the function block engine 52 may also write values or data to the function block variable pool 56. In some cases, these written values are stored only temporarily in the function block variable pool 56 for use in the execution of other function blocks or as outputs of the controller.

The function block engine 52 may allow the application designer to program the controller to perform a wide variety of functions, such as HVAC functions. The function block engine 52 sequentially executes each function block that the application designer has configured in the block execution list. In some cases, the inputs to the function blocks are referenced from the function block variable pool 56 that may be resident in RAM. In some cases, there may only be a small stack space in the function block variable pool 56, which may be reused by the function blocks for local, temporary variable storage. Additionally, in some cases, local physical and network inputs may be provided with access to the variable space.

The built-in function configuration and execute block 60 may provide a means of translating inputs (both local and network), and providing the values as variables that can be used as inputs to any or selected function blocks. In other words, in some case, the function blocks are unaware that an input to a function block came from a physical input, a network input, a parameter, or as an output from another function block. The input from the built-in function execute block 60 can be stored in the function block variable pool 56, in some cases only temporarily, for use by the function block engine 52.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

Appendix A

1 Example Analog Function Blocks

*1.1 Minimum*

This function calculates the minimum of 8 inputs. The output is set to the smallest input.

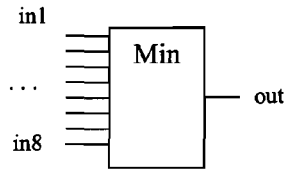

*1.2 Maximum*

This function calculates the maximum of 8 inputs. The output is set to the largest input.

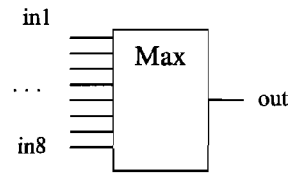

*1.3 Average*

This function calculates the average of 8 inputs. The output is set to the average of the inputs.

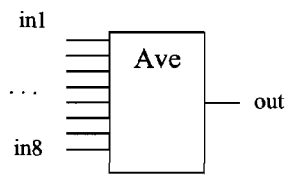

*1.4 Compare*

This function compares two inputs to each other. Input1 is compared to input2 as EQUAL, LESS_THAN or GREATER_THAN. There is an optional on and off hysteresis. Note it is possible to create invalid numbers by combining large values of input 2 and on and off hysteresis. The behavior is dependant on the operation selected, value of input 1, and the compiler.

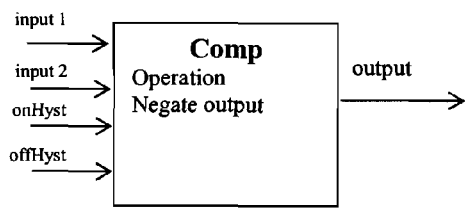

Compare Less Than

Output is set TRUE if input1 < input2 - onHyst.
Output is set FALSE if input1 >= input2 + offHyst.
Output does not change if (input2 - onHyst) <= input1 < (input2 +offHyst)

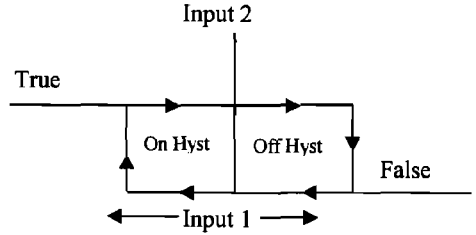

Compare Greater Than
Output is set TRUE if input1 > input2 + onHyst.
Output is set FALSE if input1 <= input2 - offHyst.
Output does not change if input1 <= input2 + onHyst && input1 > input2 - offHyst.

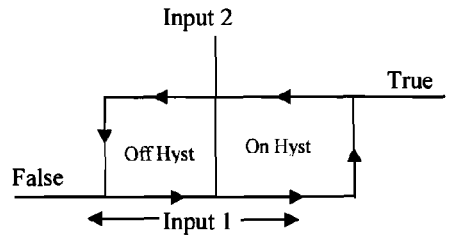

Compare Equal To
The output is set TRUE if: ( (in1 <= in2+OffHyst) && (in1 >= in2-OnHyst) )

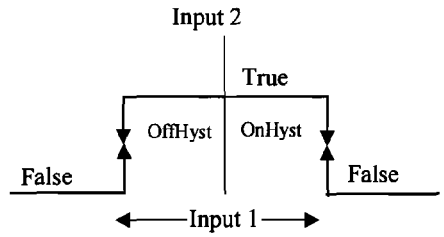

Regardless of the compare function type, there is an optional negate of the output. When negout is TRUE, the output is negated after performing the logic as specified above. The sense of the hysteresis settings does not change. When negation is selected, the old output (from the previous cycle) is determined by negating the current value of the output.

*1.5 Analog Latch*

This function latches the Y output to the value on the X input when the latch input transitions from FALSE to TRUE. The output is held at this value until the next FALSE to TRUE transition. At each FALSE to TRUE transition the Y output is latched to the current X input. If both the X and latch inputs are unconnected, the output Y will be zero (0). If the input is invalid, the output will transition to invalid when the latch input goes from FALSE to TRUE. The latch input can be negated to cause a TRUE to FALSE transition to latch X to Y. From iteration to iteration of the Function Block, the Analog Latch keeps track of the last state of the latch input so that it knows when a FALSE to TRUE transition occurs. On power up/reset the last latch value is set to FALSE, regardless of the negation configuration.

*1.6 Priority Select*

This function allows 1 to 4 inputs in any combination to be individually enabled to override the default. The output is the input with its highest priority enable TRUE. If no enables are TRUE, the output is set to the default.

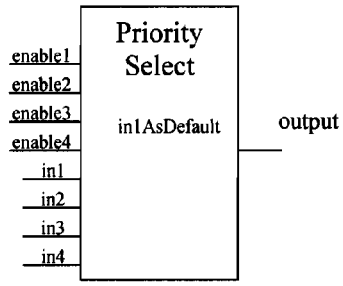

*1.7 Hysteretic Relay*

This function takes analog input in and sets the output TRUE at OnVal and FALSE at OffVal while honoring min on and off times. From iteration to iteration, the Function Block keeps track of the current minimum on or off time. On power up/reset this timer is cleared.

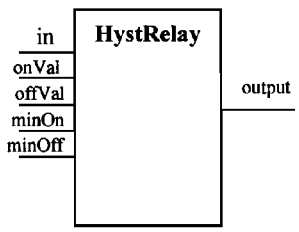

*1.8 Switch*

This function takes an enumerated type input and subtracts a user defined offset to determine which output to set TRUE, holding all others FALSE. The valid range of the input minus the offset is 0-7. The output [0-7] is TRUE if input − offset = X, otherwise it is FALSE.

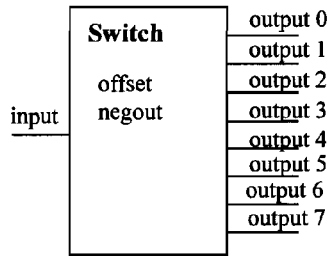

*1.9 Select*

This function selects one of the 6 input values to be transferred to the output. The input selected depends on the values of x and the offset. The default input allows multiple Select function blocks to be tied together by chaining the output of one block to the default input of the next. When Select function blocks are chained, all chained blocks receive the same input, but different offsets, so they examine different ranges of the input value. When [x-offset] selects one of the 6 inputs, the output equals the value on input[x-offset]. Otherwise, the output equals the value on the default input. If nothing is connected, the output is invalid

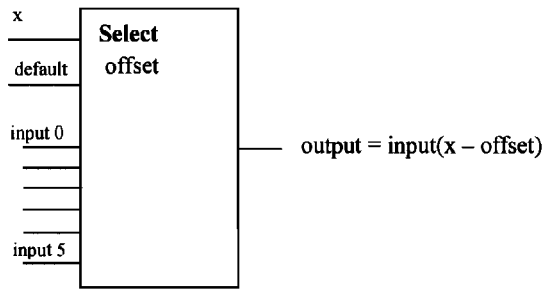

output = input(x − offset)

2 Example Logic Function Blocks

2.1 AND/NAND

This function is a 6 input AND or NAND. Each input may be individually inverted (NOT). Unconnected or invalid inputs default to TRUE, without negation, so as to have no effect on the result. From iteration to iteration, the Function Block keeps track of the last computed output value and the current true or false delay time. On power up/reset these are cleared.

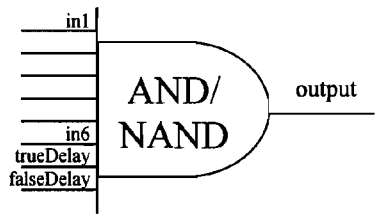

2.2 OR/NOR

This function is a 6 input OR or NOR. Each input may be individually inverted (NOT)). Unconnected or invalid inputs default to FALSE, without negation, so as to have no effect on the result. From iteration to iteration, the Function Block keeps track of the last computed output value and the current true or false delay time. On power up/reset these are cleared.

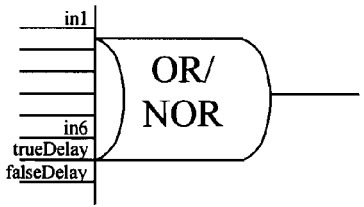

2.3 Exclusive OR/NOR

This function is a 6 input XOR or XNOR. Each input may be individually inverted (NOT). Unconnected or invalid inputs default to FALSE, without negation, so as to have no effect on the result. From iteration to iteration, the Function Block keeps track of the last computed output value and the current true or false delay time. On power up/reset these are cleared.

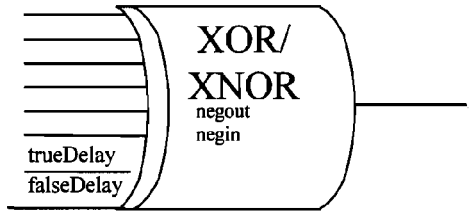

2.4 *One Shot*

This function is a one shot. When x transitions from FALSE to TRUE, y will be set to TRUE (1) for OnTime seconds. OnTime is limited to 0-65535 seconds. An OnTime of zero will keep the output OFF no matter what changes occur at the X input. Both the X input and Y output have an option to be negated. From iteration to iteration, the Function Block keeps track of the last input and the on time. On power up/reset these are cleared.

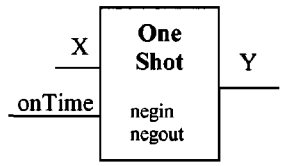

3 Example Math Function Blocks

Math functions operate on and produce single precision floating point numbers. In the absence of any other restrictions, if the result overflows the range of a single precision floating point number (approx -3.4e38 to 3.4e38) the result returned is invalid.

3.1 *Add*

This function adds the values on inputs. If the result overflows the range of a single precision floating point number (approx -3.4e38 to 3.4e38) the result returned is invalid.

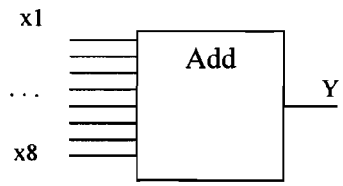

3.2 *Subtract*

This function subtracts one input from the other. Y = x1 − x2. If the result overflows the range of a single precision floating point number (approx -3.4e38 to 3.4e38) the result returned is invalid.

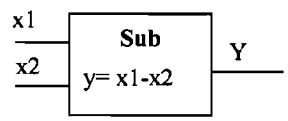

3.3 Multiply

This function multiplies one input with the other. y = x1 * x2. If the result overflows the range of a single precision floating point number (approx -3.4e38 to 3.4e38) the result returned is invalid.

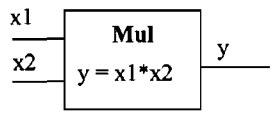

3.4 Divide

This function divides one input by the other. Y = x1 / X2. Division by 0 result in invalid output. If the result overflows the range of a single precision floating point number (approx -3.4e38 to 3.4e38) the result returned is invalid

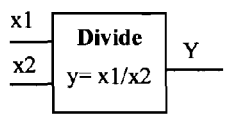

3.5 Square Root

This function takes the square root of the input. Y = $\sqrt{X}$. The behavior of a negative X input is controlled by the parameter negInvalid.

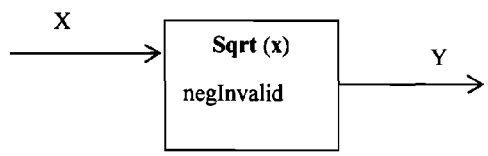

3.6 Exponential (a.k.a. Power)

This function raises y to the power of x. x and y are floating point numbers. The application designer is limited to two of these function blocks per device. Unassigned inputs are treated as 0. Invalid inputs result in an invalid output. The negInvalid input determines whether the operation should proceed with a negative base and non-integer exponent, operating on the absolute value of the base, or return invalid.

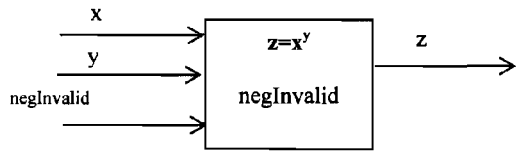

3.7 Digital Filter

This function digitally filters the input. $Y_{new} = Y_{old} + (X - Y_{old})*(1-\exp(-t/Tau))$. Where t = 1 sec and Tau is in seconds. The output can be initialized to zero (zeroInit=TRUE) or the first valid input value (zeroInit=FALSE). From iteration to iteration, the Function Block keeps track of the tau multiplier (1-exp(- t/Tau). On power up/reset this is recalculated.

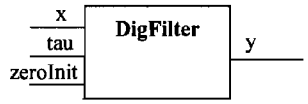

3.8 *Enthalpy*

This function computes the enthalpy (BTU/LB) based on the temperature (°F) and relative humidity (%). inputs. Relative humidity (rh) is limited to 0 to 100%. Temperature is in °F and is limited to 0-120°F.

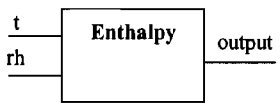

3.9 *Ratio*

This function converts the input X to the output Y based on the line defined by x1, y1 and x2, y2.
Y =y1 + (((x - x1) * (y2 - y1)) / (x2 - x1)). If (x,x1,x2,y1, or y2 = INVALID) then y = invalid.
Operation enumerations are: UNLIMITED=0, VAV_FLOW_BAL=1, ENDPT_LIMITED=2.
For VAV_FLOW_BAL to work correctly, (X2, Y2) must be greater than (X1, Y1), and both points must be in the first quadrant as shown in the figure below. If not, results will be as specified by the pseudo code.

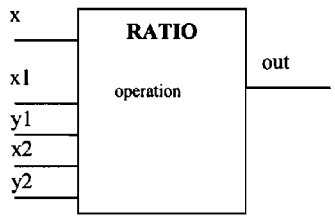

The operation selection determines how the output is computed:

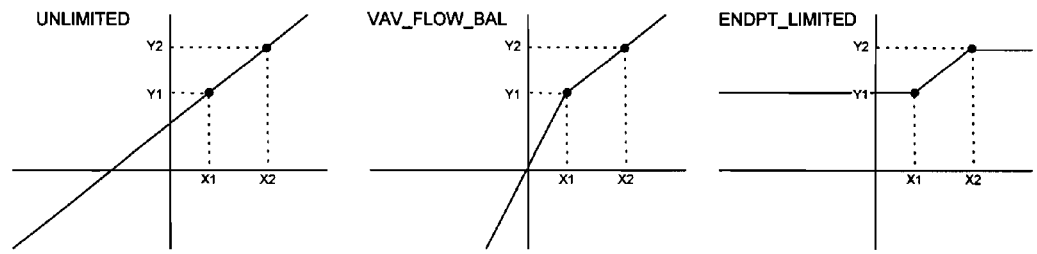

3.10 Limit

This function limits the input to between the low and high limits.

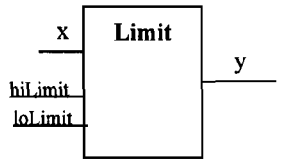

3.11 Reset

This function computes the reset value based on the relation of the input to the reset parameters.

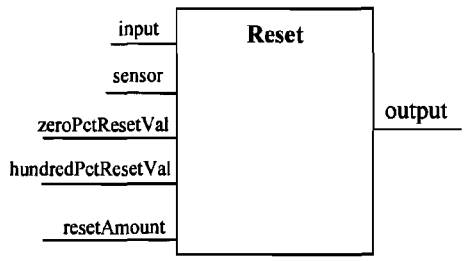

```
// reset sensor value between the zeroPctResetVal and the hundredPctResetVal
//
// restAmt __|         _____Max
//           |        /
//           |       /
//           |      /
//           |     /
//           |    /
//           |   /
//           |  /
// 0 reset __|/_____> sensor
//           |         |
//     zeroPctResetVal  hundredPctResetVal
```

3.12 Flow Velocity (from Pressure)

This function computes the flow and velocity based on the measured pressure and the K factor.

$$flow = K\sqrt{\Delta P - offset}$$

and $$vel = \frac{flow}{Area}$$

Where:
K=Flow coefficient (K-Factor) representing the actual flow in ft^3/min corresponding to a velocity pressure sensor output of 1" w.g.
ΔP=flow sensor output pressure in inches water gauge (inW).
Offset=a correction pressure (inW) to adjust for zero.
Flow=airflow in ft^3/min (CFM)
vel=flow velocity in ft/min
Area = duct area in ft^2.

K-Factor is often used in terminal unit controls to calculate actual airflow.

Setting the autoSetOffset to a non-zero number results in the current pressure being stored as an offset that will be subtracted from the current pressure. The Offset can be cleared by setting the clear offset to a non-zero number. If the pressure is within 0.002425 inW of zero (approximately 50 fpm) then set the output flow and velocity to 0.

Consistent units should be used. For example, if p is 1.02 inches water column, and if the offset is .02 inches water column, K is 1015, and the area is 0.54 square feet (10 inch diameter), then the flow will be 1015 feet per minute, and velocity will be 1879 feet per minute.

From iteration to iteration, the Function Block keeps track of the last state of the auto set offset. On power up/reset this is set to TRUE so that auto offset cannot be executed on a reset or power up.

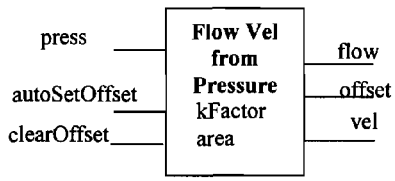

4 Example Control Function Blocks

All Control function blocks may have a default initialization behavior that will occur during power up. PID and others have an initialization input so that they can initialize under function block control.

*4.1 PID (Proportional Integral Derivative)*

This function is a Proportional Integral Derivative controller (PID).
Err = Sensor – Set Point
Kp = (Proportional Band)/100
Ti = Integral Time (seconds)
Td = Derivative Time (sec)
Bias = proportional offset (%)

$$\text{Output (\%)} = \text{bias} + Kp*\text{Err} + Kp/Ti \int_0^t (Err)dt + Kp*Td*dErr/dt$$

When Disable/Initialize input is TRUE, The Output and the integral are set to 0 and the block stops running. If Direct/Reverse is set to reverse, then Err term is set to –Err.
When Err < Dead band, Err is set to zero until Dead band Delay time has elapsed and Err is still in the dead band. To prevent integral wind up, the integral portion of the total error output is limited to 100%.

From iteration to iteration, the Function Block keeps track of the old proportional error, integral error, and dead band timer. On power up/reset these are cleared.

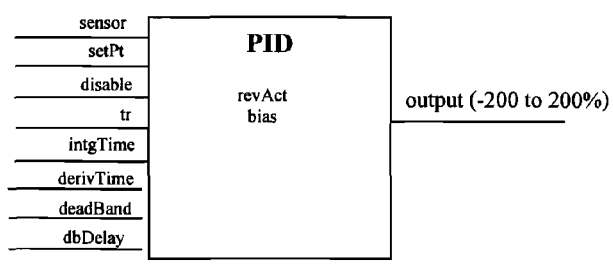

4.2 AIA (Adaptive Integral Action)

This function is an Adaptive Integral Action controller (AIA). In some cases, this can be used in place of PID. This control works better than PID when delays in the process being controlled cause integral wind-up resulting in under or overshoot that leads to instability. Err = Sensor − Set Point. If Direct/Reverse is set to reverse, then Err term is set to −Err. Tr(throttling range) is Error value that results in an Output change of the maximum value (MaxAOchange) from one step to the next. MaxAOchange is the maximum amount (%) that Output will change for a single cycle of the control (1 sec). This is typically set to 100%/(actuator speed(sec/full stroke)). Deadband is the absolute value that Error must be greater than before the output will change.

EffErr = Err − dead band
If Err > 0 , ErrSign = 1 else ErrSign = -1
If |Err| < dead band, then AbsErr = 0.
Otherwise( |Err |> dead band), AbsErr = |Err| - deadband
Output = output + ErrSign*NonLin(AbsErr,ThrottlingRange,MaxAOchange,MinAOchange) .

From iteration to iteration, the Function Block keeps track of the old proportional error. On power up/reset this is cleared.

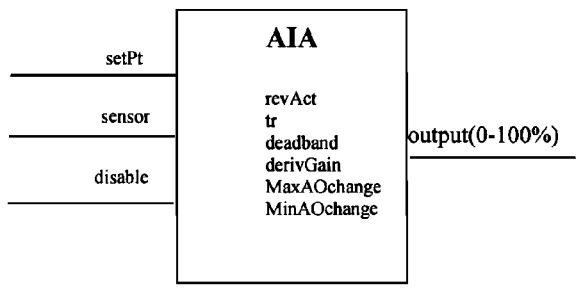

4.3 Stager/Thermostat Cycler

This function is a generic stage driver or a Thermostat Stage Cycler dependant on the value of the CPH parameter (cph=0 means stager functionality, and cph=1-60 gives thermostat cycler functionality).

The Cycler function is the traditional anticipator cycling algorithm used in Honeywell thermostats. Input is ether P or PI space temperature error in % (0-100). Standard (recommended) settings are cph=3 for cooling, cph = 6 for heating, anticAuth = 100%, hyst = 100%/maxstages/2. Also note that for multiple stage cyclers, the PID block feeding this function block should have an appropriately large throttling range to achieve smooth behavior.

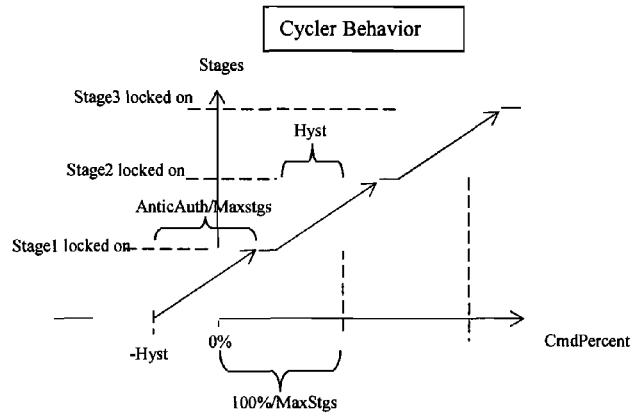

Cycler Behavior

The Stager Function takes a 0-100% (typically PID error) input and determines how many stages to turn on. The 0-100% input range is divided evenly between how many stages are configured in MaxStages. The first stage is turned on at CmdPercent > 0 and off at CmdPercent < - Hyst. As shown in fig 18.1 below the general criterion for turning on stage N is:
  CmdPercent > (N -1)*100%/MaxStages.
For turning off stage N the criterion is:
  CmdPercent < (N -1)*100%/MaxStages – Hyst.

From iteration to iteration, the Function Block keeps track of the on timer, off timer, anticipator, and CPH multiplier. On power up/reset, the off timer and anticipator are cleared, the on timer is set equal to the inter-stage on time and the CPH multiplier is recalculated.

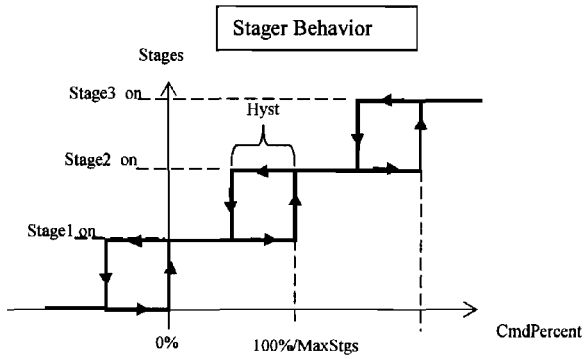

Stager Behavior

When override is true, active stages are shed (turned off) based on min on and interstage timers regardless of the CmdPercent input. Output is number of stages active (0-MaxStages) which can be sent to the StageDriver function block. Configuration parameters include:
- MaxStages is the maximum stages available to turn on.
- CPH (non-zero) is max cycle rate in Cycles Per Hour when input is halfway between stages available and AnticAuth is at default value (100%). CPH = 0 means the Stager logic is performed and has no other effect.
- Hyst is the switching differential around the switch points in % error. (Range: 0 < Hyst < 100/Maxstgs.)
- AnticAuth (cycler only (CPH != 0)) is the anticipator authority, which allows adjustment of the cycling behavior. It represents the max amount of "fake" error in % that is input into the switching logic when MaxStages are turned on. (Range 0 < AnticAuth < 200.)
- MinOnTime is minimum time a stage must be on once it is turned on.
- MinOffTime is minimum time a stage must be off once it is turned off.
- InterstageOn is minimum time before the next stage can be turned on after the previous one is turned on.
- InterstageOff is minimum time before the next stage can be turned off after the previous one is turned off.

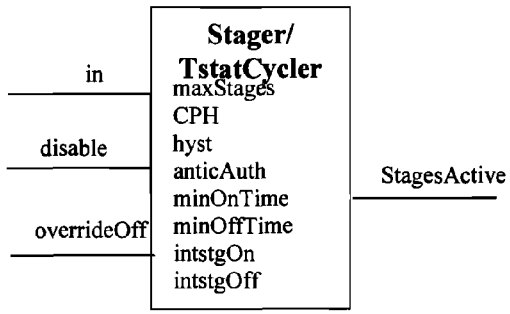

4.4 *StageDriver*

The StageDriverMaster function takes input number of stages active and determines which stages to energize or de-energize based on the lead/lag strategy chosen. StageDriver works with StageDriverAdd to distribute additional stages above those provided in StageDriver. StageDriver also maintains a nonvolatile runtime total and digital stage status information for each stage.

4.5 *Stage Driver Add*

The StageDriverAdd function takes input command from StageDriver and determines which stages to energize or de-energize based on the lead/lag strategy chosen. StageDriverAdd works with StageDriver to distribute stages. For example if StageDriver controls stage 1-6, then the first connection to StageDriverAdd could be configured to handle stages 7-14 and the second StageDriverAdd could be configured to handle stages 15-22.

4.6 *Rate Limit*

This function creates an output that follows the input but prevents the output from changing faster that the specified rates depending on direction.

The value StartInterval (sec) limits the output after the rate limit function is enabled (disable input set to 0) and the StartInteval time is still in process. Ratelimit uses the startVal input as the default output during disable.

If the rate limit function is disabled (disable input set to 1) the output will be set to StartVal.

After rateLimit is enabled (disable set to 0) then the StartInterval timer will count down from the StartInterval number of seconds and during this time the output will be rate limited..

When the timer is expired (and ratelimit is enabled) the out value will be exactly what the in is set to and there will no longer be rate limiting.

If the StartInterval seconds is set to 0 (and ratelimit is enabled), then the output will be Ratelimited.

During Ratelimit the output will move at a maximum allowed rate toward the new input value each second.

UpRate controls the rate in a more positive direction, and DownRate controls the rate in a more negative direction. UpRate set to zero means the uprate limit is not enforced. DownRate set to zero means the downrate limit is not enforced..

Out is set to StartVal before rate limiting is enabled (disable set to 0).

From iteration to iteration, the Function Block keeps track of the start timer On power/up/reset, this is set to the StartInterval.

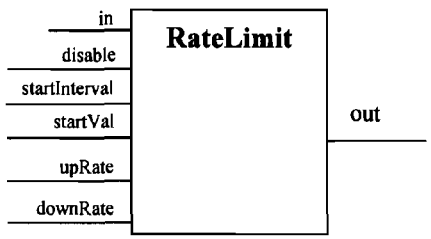

*4.7 VAV Damper Flow Control*

This function is a Variable Air Volume (VAV) Damper Flow Controller. Traditionally this is the second half of a pressure independent VAV box cascade control strategy where typically the input would come from the output of a PID block controlling space temperature. This function calculates an effective flow control set point (effFlowSetPt) and outputs a 0-100% command to drive a VAV box damper. The commanded flow set point (in percent) from a temperature control signal is mapped into the effective flow set point such that 0% maps to the min flow set point and 100%% maps to the max flow set point. The sensedFlowVol input is the volumetric flow into the box, if it is invalid (sensor fails) the damper will be driven in a "pressure dependant" mode mapping cmdFlowPercent directly to the output. The Units parameter sets the units being used for the flow sensor, set points, and duct area where 0 = cfm(flow) and $ft^2$ (area), 1 = L/s(flow) and $m^2$(area), 2 = $m^3$/hr(flow) and $m^2$(area). The cmdFlowPercent input is the input in percent from the temperature control logic. DuctArea is the duct area in units per the Units parameter selection. The motorSpeed parameter is the time the actuator being used takes to travel a full 90 deg stroke in seconds (this is used to automatically adjust the control gains). The manFlowOverride input allows the flow set point to be selectively overridden based the following codes: (taken from snvt_hvac_overid)
    0 and all others not listed = no override (normal operation)
    2 = effFlowSetPt is set to the ManFlowValue input
    6 = effFlowSetPt is set to the minFlowSetPt input
    7 = effFlowSetPt is set to the maxFlowSetPt input Manual flow override is particularly useful when trying to make the box easy to be balanced.

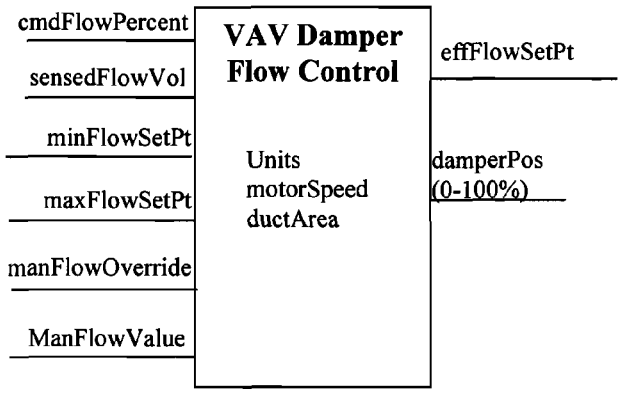

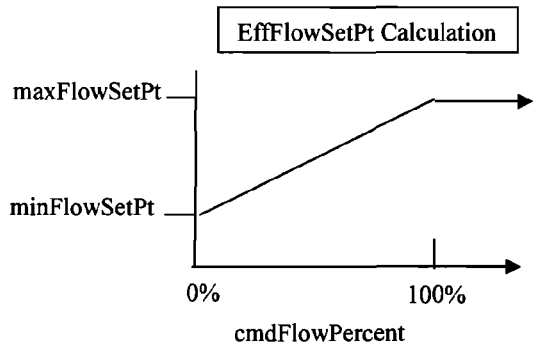

5 Example Zone Control Function Blocks

5.1 Occupancy Arbitrator

This function computes the current Effective Occupancy Current State and the Manual Override State.

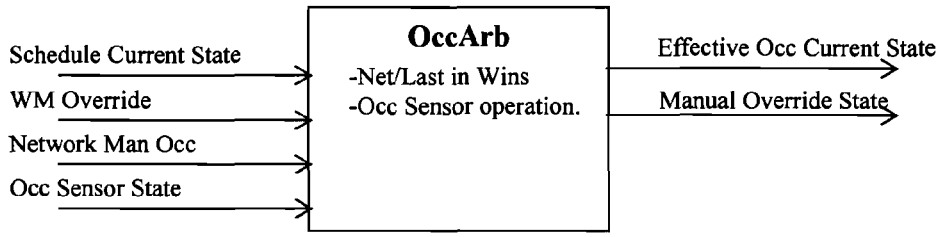

5.2 General Setpoint Calculator

This function does generic setpoint calculation, including reset. It uses the 3 configuration parameters, effective occupancy, current state, and reset input to calculate the effective setpoint.

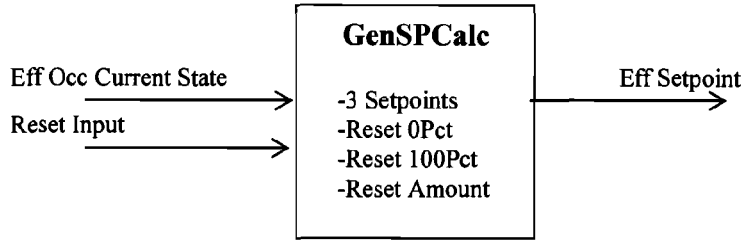

5.3 Temperature Setpoint Calculator

This function calculates the current Effective Heat setpoint and Effective Cool setpoint based on the current schedule information, occupancy override, and intelligent recovery information.

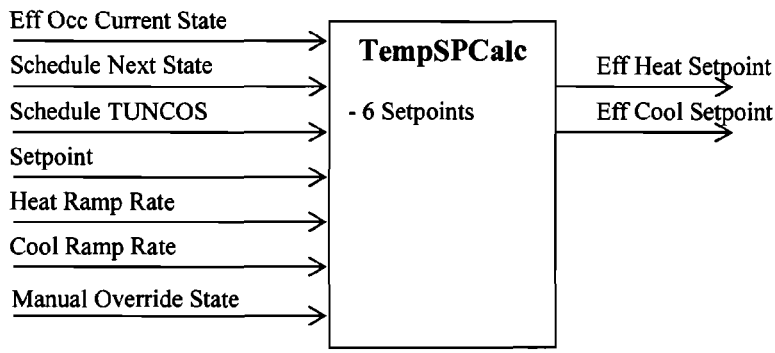

5.4 Set Temperature Mode

This function automatically calculates the effective temperature control mode based on the control type, system switch setting, network mode command, temperature set points, supply temperature and space temperature. From iteration to iteration, the Function Block keeps track of the previous application mode and the effective temperature mode. On power up/reset these are cleared.

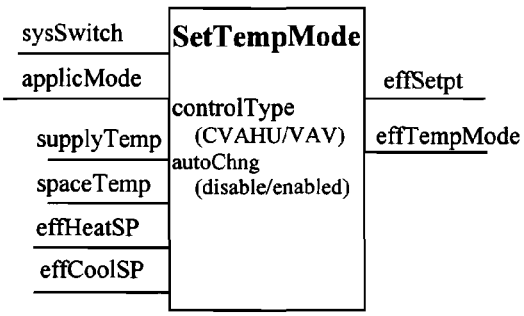

effTempMode indicates the current Mode determined by input states and arbitrated by control logic. SetTempMode does not generate all the possible Modes available. The valid enumerated values have the following meanings:

| effTempMode | Meaning |
|---|---|
| COOL=0 | Cool air is being supplied to the node via the central air supply and cooling energy is being supplied to the controlled space. |
| REHEAT=1 | Cool air is being supplied to the node via the central air supply. The air is being reheated by a local Heat source. |
| HEAT=2 | Heated air is being supplied to the node via the central air supply and heated air is being supplied to the controlled space. |
| EMERG_HEAT=3 | Emergency Heat is being supplied to the node via the central air supply. |
| OFF_MODE=255 | •Controller is commanded off. |

6 Example Data Function Blocks

6.1 Override

This function sets the output to the highest priority input that is not invalid. The Highest priority input is priority1Value and the Lowest priority input is cntrlInput. If All inputs are invalid or Unconnected, then the output is set to defaultValue. This function block corresponds to the BACnet priority array implementation with the replacement of the BACnet "NULL" state with "invalid".

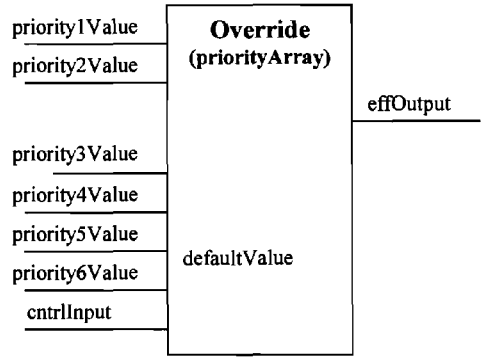

6.2 Run Time Accumulate

This function accumulates runtime whenever the input is TRUE (non zero) and the enable is TRUE. If Preset is TRUE, then runtime is set equal to the Preset Value. Runtime is provided in 4 outputs of seconds, minutes, hours and days. From iteration to iteration, the Function Block keeps track of the run time seconds. On power up/reset this is cleared.

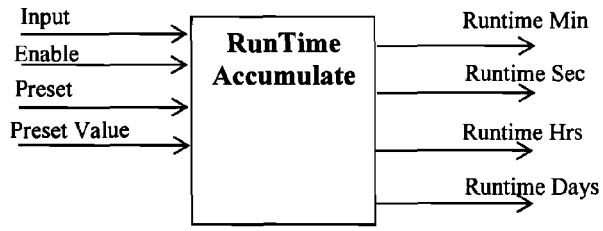

6.3 *Counter*

This function counts leading edge transitions of the input. If the enable is TRUE and the input transitions from FALSE to TRUE, then count is incremented or decremented by the count Value. Positive values on count value increment the count. Negative values decrement the count. If preset is TRUE, then count is set to the Preset Value. From iteration to iteration, the Function Block keeps track of the previous state of the input so that it can detect a transition. On power up/reset this is cleared.

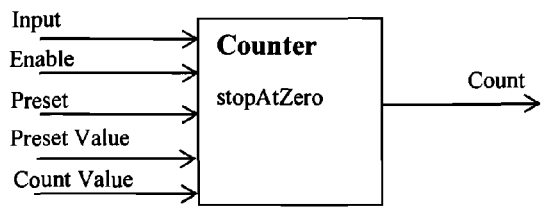

6.4 *Alarm*

This function creates an alarm based on the value of the input compared to the high and low limits. The user may create up to 32 alarm Function Blocks that will map into nvoError. From iteration to iteration, the Function Block keeps track of the alarm status and delay timer. On power up/reset these are cleared.

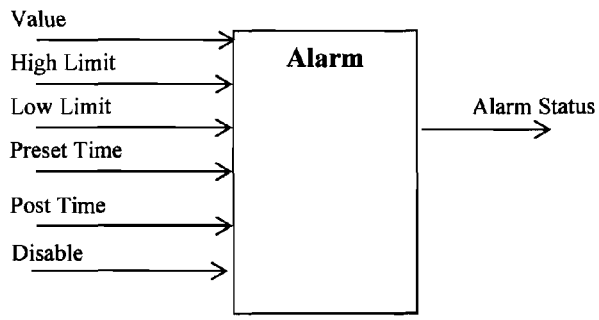

The invention claimed is:

1. A programmable HVAC controller having a controller in communication with a non-volatile memory and a random-access memory (RAM), the programmable HVAC controller comprising:
   a function block engine having at least one program capable of being executed by the controller, the function block engine capable of executing one or more function blocks, the function block engine being resident in the non-volatile memory;
   a block execution list identifying one or more of the function blocks, the block execution list being resident in the non-volatile memory;
   a parameter and/or variable storage space being resident in the RAM;
   wherein the function block engine program is executed by the controller from the non-volatile memory; and
   wherein the function block engine program executes those one or more function blocks identified by the block execution list.

2. The programmable HVAC controller of claim 1 wherein the block execution list is field programmable.

3. The programmable HVAC controller of claim 1 wherein the block execution list is programmable for a specific application.

4. The programmable HVAC controller of claim 2 wherein at least some of the one or more function blocks implement one or more higher-level HVAC functions.

5. The programmable HVAC controller of claim 4 wherein the function block includes one or more parameters and/or one or more references.

6. The programmable HVAC controller of claim 5 wherein at least some of the one or more parameters and/or one or more references include a pointer to data stored in memory.

7. The programmable HVAC controller of claim 6 wherein the function block engine program executes the function blocks in sequence according to the block execution list.

8. The programmable HVAC controller of claim 1 wherein RAM is used for passing variables and parameters to and/or between the function blocks.

9. The programmable HVAC controller of claim 8 wherein the total RAM is about 5 k or less.

10. The programmable HVAC controller of claim 1 wherein the non-volatile memory is FLASH memory.

11. The programmable HVAC controller of claim 1 wherein the non-volatile memory is programmable read only memory (PROM).

12. The programmable HVAC controller of claim 11 wherein the non-volatile memory is electrically erasable programmable read only memory (EEPROM).

13. The programmable HVAC controller of claim 1 wherein the non-volatile memory and RAM are provided on a single microcontroller.

14. A programmable HVAC controller having non-volatile memory and random-access memory (RAM), wherein the non-volatile memory has at least two portions, a first portion for storing firmware and a second portion that is user programmable, comprising:
   a function block engine resident in the first portion of the non-volatile memory;
   a block execution list resident in the second portion of the non-volatile memory; and
   a parameter and/or variable storage space resident in the RAM;
   wherein the block execution list is field programmable.

15. The programmable HVAC controller of claim 14 further comprising a constant value storage space resident in at least a portion of the non-volatile memory.

16. The programmable HVAC controller of claim 14 wherein the non-volatile memory is FLASH memory.

17. The programmable HVAC controller of claim 14 wherein the non-volatile memory is electrically erasable programmable read only memory (EEPROM).

18. The programmable HVAC controller of claim 14 wherein the non-volatile memory is RAM with a battery back-up.

19. The programmable HVAC controller of claim 14 wherein the non-volatile memory and the RAM are provided on a single microcontroller.

20. The programmable HVAC controller of claim 14 wherein the total RAM is about 5 k or less.

21. The programmable HVAC controller of claim 19 wherein the microcontroller includes a CPU, one or more inputs and outputs, and an A/D converter.

22. The programmable HVAC controller of claim 14 wherein the function block engine executes one or more programs, the one or more programs being executed primarily from the non-volatile memory.

23. The programmable HVAC controller of claim 14 wherein the block execution list identifies one or more function blocks, wherein at least some of the one or more function blocks implement a higher-level HVAC function.

24. The programmable HVAC controller of claim 23 wherein the one or more function blocks include one or more parameters and/or one or more variables that are references to stored data in the memory.

25. A method of operating a HVAC controller having non-volatile memory and random-access memory (RAM), the method comprising:
   storing a list of function blocks in non-volatile memory;
   executing a program according to the configured list of function blocks;
   when executing a function block:
      executing the function blocks from the non-volatile memory;
      reading variables stored from the RAM; and
      writing values to the RAM.

26. The method of claim 25 further comprising installing the HVAC controller in a HVAC system, wherein the function blocks are stored and configured after installation.

27. The method of claim 25 further comprising providing each function block with a function block type, one or more parameters, and one or more references, wherein at least some of the parameters and/or references include a pointer to either the RAM or to a constant storage space in the non-volatile memory.

28. The method of claim 25 wherein the non-volatile memory and RAM are provided on a single microcontroller.

29. The method of claim 25 wherein the non-volatile memory is FLASH memory.

30. A HVAC controller having non-volatile memory and random-access memory (RAM) comprising:
   one or more execution modules resident in the non-volatile memory;
   one or more application configuration modules resident in the non-volatile memory; and
   a parameter storage space resident in the RAM;
   wherein one or more execution modules execute at least one program from the non-volatile memory;

wherein the one or more application configuration modules are field programmable.

31. The HVAC controller of claim 30 wherein the non-volatile memory and RAM are provided on a single microcontroller.

32. The HVAC controller of claim 30 wherein the non-volatile memory is FLASH.

* * * * *